(12) United States Patent
Inamine

(10) Patent No.: US 6,196,735 B1
(45) Date of Patent: Mar. 6, 2001

(54) INTERFACE SYSTEM

(75) Inventor: Noboru Inamine, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/441,668

(22) Filed: Nov. 17, 1999

(30) Foreign Application Priority Data

Nov. 18, 1998 (JP) .................................................. 10-328041

(51) Int. Cl.$^7$ ...................................................... B41J 11/44
(52) U.S. Cl. .................................. 400/76; 400/70; 400/61
(58) Field of Search .................................. 400/76, 61, 70, 400/74; 101/114, 115, 116, 129

(56) References Cited

U.S. PATENT DOCUMENTS

| | | | |
|---|---|---|---|
| 5,214,772 | * 5/1993 | Weinberger et al. | 395/575 |
| 5,502,543 | * 3/1996 | Aboujaoude | 355/202 |
| 5,561,501 | * 10/1996 | Honma | 355/204 |
| 5,798,738 | * 8/1998 | Yamada | 345/2 |

* cited by examiner

*Primary Examiner*—John S. Hilten
*Assistant Examiner*—Charles H. Nolan, Jr.
(74) *Attorney, Agent, or Firm*—Nixon Peabody LLP; Donald R. Studebaker

(57) ABSTRACT

An interface system transmits printing data from a computer to a stencil printer and transmits status information on the stencil printer to the computer. A previously-transmitted status information memory stores status information on the stencil printer which has been previously transmitted to the computer. Status difference information which represents difference of the updated status information, as transmitted from the stencil printer, from the previously status information stored in the memory is generated and transmitted to the computer on request from the computer.

7 Claims, 5 Drawing Sheets

FIG.3

| | | |
|---|---|---|
| ID No.1 | INTERFACE STATUS | VARIABLE |
| ID No.2 | PRINTER BASIC STATUS | VARIABLE |
| ID No.3 | REMAINDER COPY NUMBER STATUS (UPPER BYTE) | VARIABLE |
| ID No.4 | REMAINDER COPY NUMBER STATUS (LOWER BYTE) | VARIABLE |
| ID No.5 | PRINTING SPEED/DENSITY STATUS | VARIABLE |
| ID No.6 | ERROR/CONSUMABLES STATUS | VARIABLE |
| ID No.7 | PAPER STATUS | VARIABLE |
| ID No.8 | PERIPHERAL SYSTEM ACTION STATUS | VARIABLE |
| ID No.9 | REMAINDER CONSUMABLE STATUS | VARIABLE |
| ID No.10 | PRINTER VIDEO CLOCK STATUS | FIXED |
| ID No.11 | HORIZONTAL RESOLUTION STATUS | FIXED |
| ID No.12 | VERTICAL RESOLUTION STATUS | FIXED |
| ID No.13 | EFFECTIVE PRINTING AREA STATUS | FIXED |
| ID No.14 | | |
| ID No.15 | | |
| ID No.16 | | |
| ID No.17 | | |
| ID No.18 | PRINTER VERSION | FIXED |

0X01 : BASIC STATUS REQUEST

0X02 : NUMBER OF COPIES REQUEST

0X03 : RESOLUTION REQUEST

FIG.6
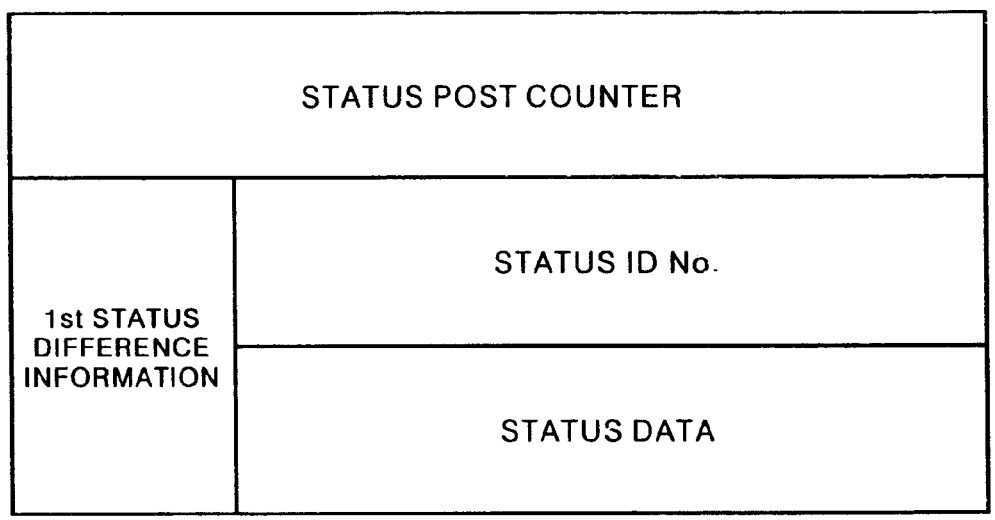
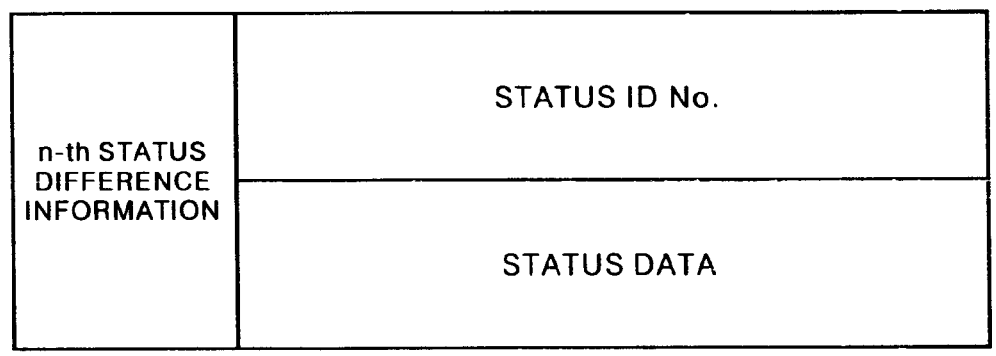

INTERFACE SYSTEM

BACKGROUND OF THE INVENTION

1. Field of the Invention

This invention relates to an interface system for watching the status of a stencil printer when printing data generated by a computer is output to the stencil printer.

2. Description of the Related Art

A stencil printer is sometimes connected to a computer by way of an interface system to print on request from the computer. As a printer driver installed in the computer, there has been known one which has function of watching the status of the stencil printer. When printing data are transmitted to the interface system by way of the printer driver from the computer, the interface system analyzes the printing data and converts the data to raster data. The interface system outputs the raster data as page data and the stencil printer prints on the basis of the page data. The interface system is provided with a status control means which sets instruction on the action of the stencil printer on request from the computer. The interface system takes information on whether the stencil printer is in a stopped state, in action, or in an error state as status information through the status control means and stores the information in an updated status memory means. The interface system sends the updated status of the stencil printer on request from the computer. The printer driver of the computer outputs request to switch the direction of data transfer to the interface system when the status information becomes necessary during transfer of the printing data, and the interface system sends the updated status information in a predetermined data length to the computer upon receipt of the request.

During receiving the status information, the printer driver transfers and receives the status information in a fixed format wherein it outputs request to switch the direction of data transfer to the printing data transfer direction after it receives the predetermined data length. Further there has been known a variable format wherein the printer driver watches the time interval between adjacent series of data (time-out period) at a breakpoint of status information from the interface system, recalculates the time- out period each time it receives a series of data, and outputs request to switch the direction of data transfer to the printing data transfer direction after the time-out period lapses.

As the standard of data transmission between the computer and the printer, there have been known a compatibility mode, a nibble mode, a byte mode, an ECP mode and an EPP mode. When the computer and the printer are connected in parallel, the compatibility mode is generally used in the case of one-way communication which is a conventional system. In order to realize two-way communication, the nibble mode is employed as a basic system. That is, when normal printing data are send to the printer from the computer, the printing data is transferred in the compatibility mode and when the computer requires status information on the printer, the status information is transferred from the printer to the computer in the nibble mode. Accordingly, during printing, the printing data and the status information are alternately transferred at predetermined intervals.

In the case of the fixed format, communication of a predetermined amount of data is constantly required even if change in status of the stencil printer is small, which results in low utilization of data. In the case of the variable format, the last time-out period is vain, which also results in low utilization of data when switching between transfer of the status information and that of the printing data is frequent.

SUMMARY OF THE INVENTION

In view of the foregoing observations and description, the primary object of the present invention is to provide an interface system which can efficiently transfer the status information.

In accordance with the present invention, there is provided an interface system which transmits printing data from a computer to a stencil printer and transmits status information on the stencil printer to the computer, characterized by having a previously-transmitted status information memory which stores status information on the stencil printer which has been previously transmitted to the computer, an updated status information receiving means which receives from the stencil printer updated status information on the stencil printer, a status difference information generation means which generates status difference information which represents difference of the updated status information from the status information which has been previously transmitted to the computer, and a status difference information transmitting means which transmits the status difference information to the computer on request from the computer.

The term "status information" used here means information on whether the stencil printer is in a stopped state, in action, or in an error state.

It is preferred that the interface system of the present invention be provided with a means for transmitting the updated status information in place of the status difference information when so requested by the computer.

Further it is preferred that the status difference information generation means be provided with a means which separates the updated status information into fixed status information which represents the fixed status of the stencil printer and variable status information which represents the variable status of the stencil printer, and generates the status difference information on the basis of the variable status information.

In accordance with the present invention, since only the status difference information which represents difference of the updated status information from the previously transmitted status information is transmitted to the computer, the amount of data to be transmitted is minimized and the status information on the stencil printer can be efficiently transmitted to the computer. Accordingly, even in the case where the amount of printing data is large as in a host base printer driver, the status of the stencil printer can be watched without deteriorating data transmission efficiency. Especially when the status information is transmitted to the computer from the interface system interrupting transfer of the printing data from the computer to the interface in a nibble mode of IEEE 1284, where data are transmitted 4 bits by 4 bits, the status information can be more efficiently transmitted by reducing the amount of data in the manner described above. Further, in the case where a plurality of computers are connected to the interface system through a LAN or the data are transferred via a modem, data traffic can be reduced and data transfer efficiency is improved by reducing the amount of data of status information.

When the interface system of the present invention is provided with a means for transmitting the updated status information in place of the status difference information when so requested by the computer, the whole updated status information can be transmitted to the computer in situations where the previously transmitted status information has been lost from the computer, e.g., by disconnecting the computer from the power source or a different computer is connected to the interface system.

Further when the status difference information is generated on the basis of the variable status information by separating the updated status information into the fixed status information and the variable status information, the communication load between the interface system and the stencil printer can be lightened, whereby the status information can be transferred more efficiently.

BRIEF DESCRIPTION OF THE DRAWINGS

FIG. 3 is a view showing the data structure of the status information, FIG. 6 is a view showing the data structure of the status difference information.

DESCRIPTION OF THE PREFERRED EMBODIMENT

Figure 1:
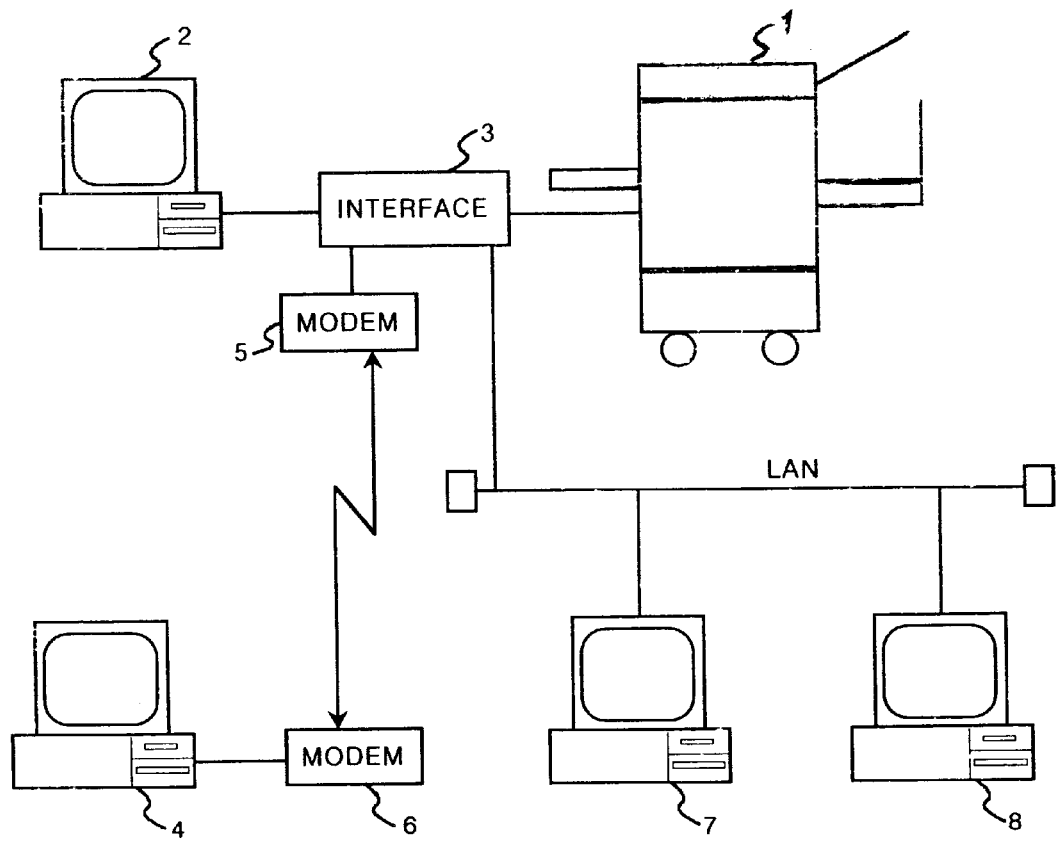
FIG. 1 is a block diagram showing a printing system provided with an interface system in accordance with an embodiment of the present invention.

In FIG. 1, a printing system comprises a stencil printer 1, which is composed of a stencil making section and a stencil printing section, a computer 2 which outputs printing instructions to the stencil printer 1 and watches the status of the stencil printer, and an interface system 3 in accordance with an embodiment of the present invention. Further a second computer 4 is connected to the interface system 3 through a pair of modems 5 and 6 and a telephone line, and third and fourth computers 7 and 8 are connected to the interface system through a LAN. Exchange of data between the second computer 4 and the interface system 3 and that between the third and fourth computers 7 and 8 and the interface system 3 are the same as that between the first computer 2 and the interface system 3. Accordingly exchange of data between the first computer 2 and the interface system 3 will be only described, hereinbelow.

Figure 2:
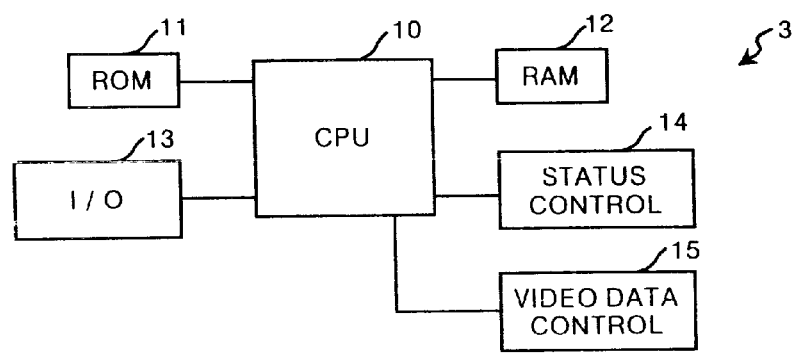
FIG. 2 is a block diagram showing the interface system.

As shown in FIG. 2, the interface system 3 comprises a CPU 10 which controls the interface system 3, and a ROM 11, a RAM 12, an input/output means 13, a status control means 14 and a video data control means 15 which are connected to the CPU 10.

The status control means 14 controls the status of the stencil printer 1 and the video data control means 15 controls video data generated by printing data. The interface system 3 switches the direction of data transfer when the computer 2 requests the status information on the stencil printer 1 during transmission of printing data from the computer 2 and transmits the status information from the stencil printer 1 to the computer 2.

The ROM 11 stores therein programs having various functions for controlling the interface system 3. Specifically, there stored in the ROM 11 programs for executing functions of controlling input of printing data into the stencil printer 1, controlling output of the status information from the interface system 3 to the computer 2, updating the structure of the status information transmitted from the stencil printer 1, controlling input of the status information from the stencil printer 1 to the interface system 3, analyzing the printing data from the computer 2 to obtain raster data, and controlling output of video data to the stencil printer 1.

The RAM 12 temporarily stores data transmitted to the interface system 3 or data to be transmitted to the stencil printer 1 or the computer 2. Specifically, the RAM 12 stores the printing data to be transmitted from the computer 2 to the stencil printer 1, the raster data obtained by analyzing the printing data, the updated status information, the previously transmitted status information which has been previously transmitted to the computer 2, the status difference information which represents a difference of the updated status information from the previously transmitted status information and are obtained in the manner to be described later, and the like.

The input/output means 13 is for exchanging data with the external systems. Specifically, the input/output means 13 receives the printing data and the status information from the computer 2 as well as request for refresh status (to be described later), and outputs the status information to the computer 2.

The status control means 14 sets instructions on the action of the stencil printer 1 and takes in the status information on the status of the stencil printer 1, that is, whether the stencil printer 1 is in a stopped state, in action, or in an error state.

The video data control means 15 outputs the raster data in the RAM 12 to the stencil printer 1.

As shown in FIG. 3, the status of the stencil printer 1 comprises fixed status which is not varied with progress of printing or lapse of time (e.g., status of video clock of the stencil printer 1, status of version of the stencil printer 1 and the like) and variable status such as the number of remainder copies, the printing speed and the size of the printing papers. The contents of the status are distinguished by an ID number. The fixed status information does not change after it is once transmitted to the computer 2. Accordingly, in this particular embodiment, the updated status information transmitted from the stencil printer 1 is separated into fixed status information and variable status information, and status difference information is generated on the basis of only the variable status information. That is, the status difference information is obtained by collecting only variable status information which represents status of the stencil printer 1 different from the status represented by the previously transmitted status information corresponding thereto, and then is transmitted to the computer 2.

Figure 4:
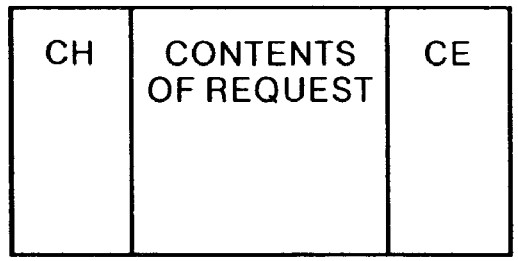
FIG. 4 shows forms of request command to the stencil printer and response status from the stencil printer.
Figure 5:
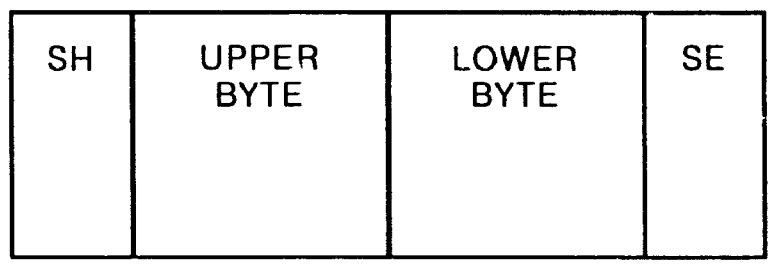
FIG. 5 is a view showing an example of "request content"

The status of the stencil printer 1 is taken in by the interface system 3 in the following manner. FIG. 4 shows forms of request command to the stencil printer 1 and response status from the same. In the form of the request command, "CH" represents a command header (the start of the command packet), "CE" represents the end of command (the end of the command packet), and "content of request" represents the contents of request such as those shown in FIG. 5. In FIG. 5, "0x01" means that the basic status is requested, "0x02" means that the number of copies to be printed is requested, and "0x03" means that the resolution is requested. In the form of the response status shown in FIG. 4, "SH" represents a status header (the start of the status packet) and "SE" represents the end of status (the end of the status packet). For example, for a request "0x02", the upper byte and the lower byte of the response status on the number of copies to be printed are taken and recorded in the updated status information at ID numbers 3 and 4.

When the power source is turned on, the interface system 3 transmits various request packets to the stencil printer 1 in order to obtain various kinds of status information. The stencil printer 1 analyzes the request packets and transmits response status packets in response to the request packets to the interface system 3. As for the variable status, the interface system 3 repeatedly makes request at predetermined intervals and stores the status information at the respective times in the RAM 12 in sequence. The interface system 3 reads out the updated status information, determines the status difference information and transmits the status difference information to the computer 2 on request from the computer 2.

As shown in FIG. 6, the status difference information comprises a status post counter and n pieces of status information. k-th (k stands for 1 to n) status information includes the status ID number for the status information and the status data. The status post counter is attached only to the first status difference information and represents the status ID numbers and the number of pieces of the status data (n in this particular example) in the status difference information to be transmitted. The status ID numbers are those in the updated status information shown in FIG. 3 and the status data represents the actual content of the status which has changed. For example, when only the lower byte for the number of remainder copies changes from 8 to 7, the status difference information becomes the following 3-byte data.

first byte: 0×01
second byte: 0×04
third byte: 0×07

"0×01" of the first byte represents the value of the status post counter, "0×04" of the second byte represents an ID number of 4, and "0×07" of the third byte represents that the lower byte of the response status on the number of remainder copies to be printed is 7.

Figure 7:
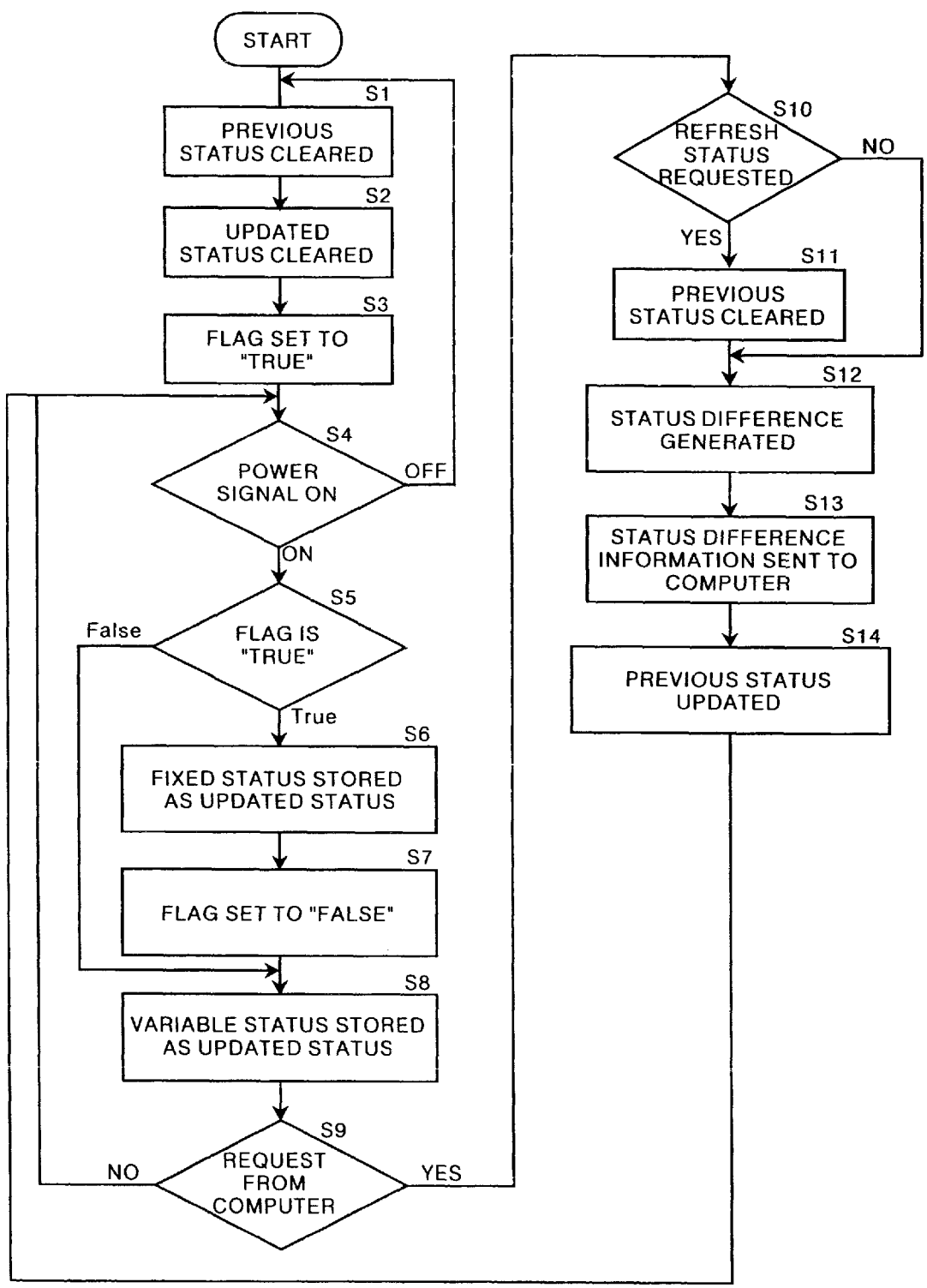
FIG. 7 is a flow chart for illustrating operation of the interface system of this embodiment.

Operation of the printing system of this embodiment will be described with reference to the flow chart shown in FIG. 7, hereinbelow. When the power source is turned on, the interface system 3 clears the previously transmitted status information and the updated status information. (steps S1 and S2) Then the fixed status request flag is set to "True". (step S3) Thereafter it is determined whether the power signal of the stencil printer 1 is on. (step S4) When it is in step S4 determined that the power signal is not on, steps S1 to S4 are repeated until the power signal is turned on. When it is determined in step S4 that the power signal is on, it is determined whether the fixed status request flag is "True" of "False". (step S5) When it is determined in step S5 that the fixed status request flag is "True", the interface system 3 takes in the fixed status of the stencil printer 1 and stores the fixed status in the RAM 12 as updated status information (step S6) and sets the fixed status request flag to "False" (step S7). Then the interface system 3 takes in variable status and stores the variable status in the RAM 12 as updated status information. (step S8) On the other hand, when it is determined in step S5 that the fixed status request flag is "False", the interface system 3 directly executes step S8 after step 5 and the interface system 3 takes in variable status and stores the variable status in the RAM 12 as updated status information. (step S8) Then the interface system 3 determines in step S9 whether the computer 2 is making a request for the status information. When it is determined in step S9 that the computer 2 is not making a request for the status information, the interface system 3 repeats steps S4 to S9 until the computer 2 comes to make the request.

When it is determined in step S9 that the computer 2 is making a request for the status information, the interface system 3 determines in step S10 whether the computer 2 is making a request for refresh status information. When it is determined in step S10 that the computer 2 is not making a request for refresh status information, the interface system 3 extracts only the variable status from the status information transmitted from the stencil printer 1 as updated status information and generates status difference information as the difference of the variable status of the updated status information from the previously transmitted status information which has been previously transmitted to the computer 2. (step S12) When it is determined in step S10 that the computer 2 is making a request for refresh status information, the interface system 3 first clears previously transmitted status information stored in the RAM 12 (step S11) and then executes step S12. Accordingly, in this case, the status difference information generated by the interface system 3 becomes equal to the updated status information as transmitted from the stencil printer 1. Then in step S13, the interface system 3 transmits the status difference information thus obtained to the computer 2. Thereafter the interface system 3 updates the previously transmitted status information according to the status difference information in step S14 and then returns to step S4. Then the interface system 3 repeats steps S4 to S14 until the computer 2 stops watching the status of the stencil printer 1. When the computer 2 stops watching the status of the stencil printer 1, the interface system 3 stops transmission of the status information.

As can be understood from the description above, in the printing system of this embodiment, since only the status difference information which represents difference of the updated status information from the previously transmitted status information is transmitted to the computer 2, the amount of data to be transmitted is minimized and the status information on the stencil printer 1 can be efficiently transmitted to the computer 2.

Though, in the embodiment described above, the updated status information transmitted from the stencil printer 1 is separated into fixed status information and variable status information, and status difference information is generated on the basis of only the variable status information, the status difference information may be generated without separating the updated status information into fixed and variable status information.

What is claimed is:

1. An interface system which transmits printing data from a computer to a stencil printer and transmits status information on the stencil printer to the computer, said interface system comprising:
    a previously-transmitted status information memory for storing status information on the stencil printer which has been previously transmitted to the computer,
    an updated status information receiving means for receiving from the stencil printers updated status information on the stencil printer,
    a status difference information generation means for generating status difference information which represents a difference of the updated status information from the status information which has been previously transmitted to the computer, and
    a status difference information transmitting means for transmitting the status difference information to the computer on request from the computer.

2. An interface system as defined in claim 1 further comprising a means for transmitting the updated status information in place of the status difference information when so requested by the computer.

3. An interface system as defined in claim 1 wherein status difference information generation means further comprises a means for separating the updated status information into fixed status information which represents the fixed status of the stencil printer and variable status information which represents the variable status of the stencil printer, and wherein the status difference information generation means generates the status difference information on the basis of the variable status information.

4. A printing system, comprising:

a computer;

a printer; and an interface which transmits printing data from the computer to the printer and transmits status information on the printer to the computer, said interface system further comprising:

a previously-transmitted status information memory for storing status information on the stencil printer which has been previously transmitted to the computer, an updated status information receiving means for receiving, from the printer, updated status information on the printer, a status difference information generation means for generating status difference information which represents a difference of the updated status information from the status information which has been previously transmitted to the computer, and a status difference information transmitting means for transmitting the status difference information to the computer on request from the computer.

5. A printing system as defined in claim 4 further comprising a means for transmitting the updated status information in place of the status difference information when so requested by the computer.

6. A printing system as defined in claim 4 wherein status difference information generation means further comprises a means for separating the updated status information into fixed status information which represents the fixed status of the stencil printer and variable status information which represents the variable status of the stencil printer, and wherein the status difference information generation means generates the status difference information on the basis of the variable status information.

7. A printing system as defined in claim 4, wherein said printer is a stencil printer.

\* \* \* \* \*